S. J. MADDOCK.
Braiding Guide for Sewing Machines.
No. 36,847. Patented Nov. 4, 1862.
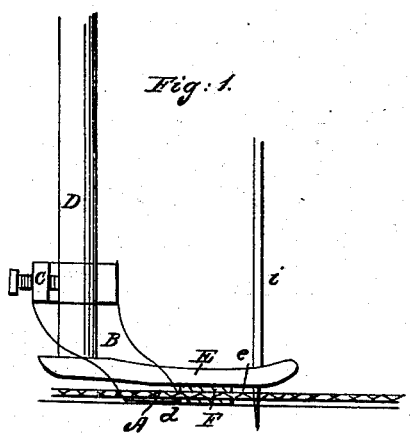
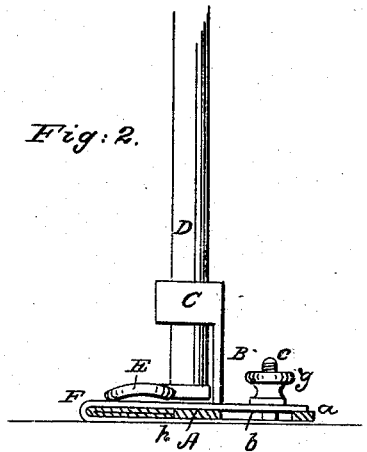
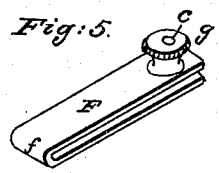
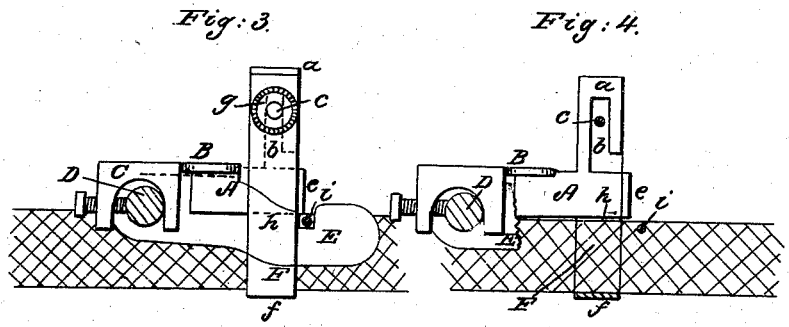
Witnesses:
J. W. Coombs
Wm. Tusch
Inventor:
S. J. Maddock
per Munn & Co.
attys.

UNITED STATES PATENT OFFICE.

STEPHEN J. MADDOCK, OF CINCINNATI, OHIO.

IMPROVEMENT IN BRAIDING-GUIDES FOR SEWING-MACHINES.

Specification forming part of Letters Patent No. 36,847, dated November 4, 1862.

*To all whom it may concern:*

Be it known that I, STEPHEN J. MADDOCK, of Cincinnati, in the county of Hamilton and State of Ohio, have invented a new and Improved Sewing-Machine Guide; and I do hereby declare that the following is a full, clear, and exact description of the same, reference being had to the accompanying drawings, forming part of this specification, in which—

Figures 1 and 2 are upright sectional views of the gage at right angles to each other, exhibiting its application to the presser of a sewing-machine. Fig. 3 is a plan of the same. Fig. 4 is a horizontal section of the same. Fig. 5 is a perspective view of the adjustable guide.

Similar letters of reference indicate corresponding parts in the several figures.

My invention consists in a guide adapted to the sewing on of braid or other fabric of similar character, its principal feature being a flat double gage, through which the braid or other material passes, and which is adjustable for different widths of braid.

To enable others skilled in the art to make and use my invention, I will proceed to describe its construction and operation.

A $a$ is a plate of angular form, attached rigidly to or formed in the same piece with an arm, B, which is made with a screw-clamp, C, to attach it to the stem D of the ordinary presser, E, which is represented in Figs. 1, 2, 3, and 4 in red color. The portion A of the said plate, which is next the arm B, is intended to occupy a position parallel with the feed movement, and the portion $a$ stands at right angles to A and has an angular slot, $b$, which opens into one edge for the reception of the set-screw $c$ of the gage F. The portion $a$ is cut away on the under side to form a straight shoulder, $d$, and has on the upper side a straight projection, $e$, the distance between the said shoulder and projection being equal to the width of the gage F. The gage F is formed of a long thin strip of steel, brass, or other elastic metal, doubled at $f$, that it may receive within it the plate A $a$. The set-screw $c$ is riveted or soldered to the lower part of the plate and passes through a hole in the the upper part, above which it is fitted with a nut, $g$.

The guide may be fitted with two or more gages of different lengths to make it serve for all widths of braid, from the narrowest to the widest.

The gage is adjustable lengthwise and in a direction parallel with the part $a$ of the plate A $a$ to enable it to be adapted to different widths of braid, the braid represented in blue color passing through the gage between the edge $h$ of the portion A of the plate and the bend $f$ of the gage. The clamp C of the gage is so attached to the stem of the presser that the foot of the latter rests upon the gage and that the needle $i$ will pass close to the side of the gage and to the corner of the plate A $a$. The nut $g$ secures the gage to the plate A $a$ in position for the width of braid to which it may be adjusted, the fixed edge $h$ always guiding the edge to be sewed at a proper distance from the needle, and the cloth to which the braid is sewed passing under the gage, which presses upon it in the same manner as the presser-foot does in ordinary sewing. To adjust the gage, the nut is unscrewed and the gage is moved longitudinally between the shoulder $d$ and projection $e$. To remove the gage, the nut is unscrewed sufficiently to allow the gage to open wide enough to slip over the projection $e$ when the screw $c$ is brought opposite the open part of the slot.

Having thus described my invention, I claim and desire to secure by Letters Patent—

As an improved article of manufacture, a braid-guide for sewing-machines, composed of an adjustable double gage, F, and a plate, A $a$, having an attached arm, B, all constructed and operating together as herein shown and described, for the purpose set forth.

STEPHEN J. MADDOCK.

Witnesses:
GEORGE P. ORR,
WM. GEOGHEGAN.